March 10, 1959 W. T. RECTOR 2,877,101
FLUID-LIQUID CONTACTING SYSTEM
Filed Aug. 13, 1956
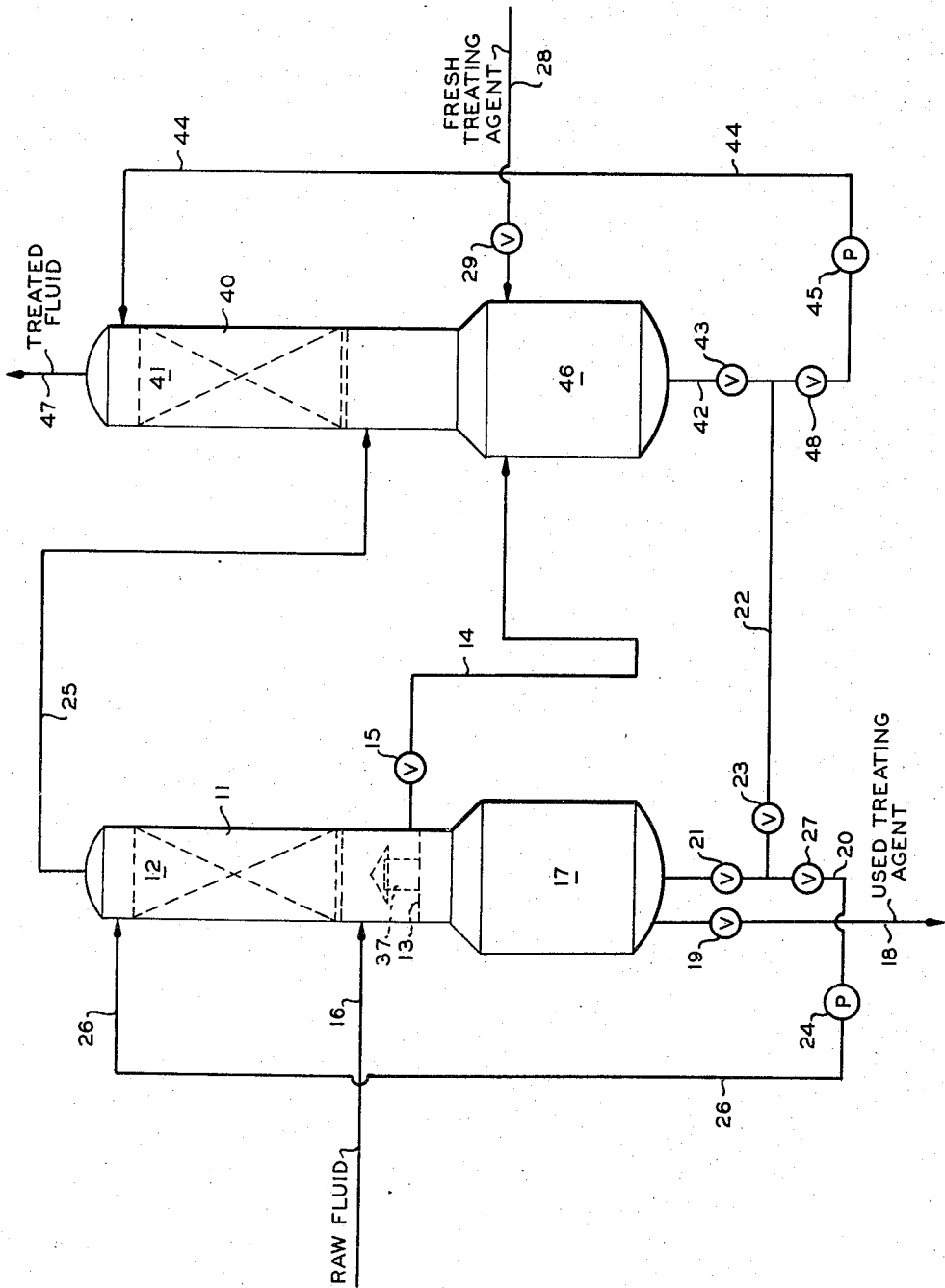
INVENTOR.
W. T. RECTOR
BY
ATTORNEYS

United States Patent Office 2,877,101
Patented Mar. 10, 1959

2,877,101

FLUID-LIQUID CONTACTING SYSTEM

Walter T. Rector, Bartlesville, Okla., assignor to Phillips Petroleum Company, a corporation of Delaware Application August 13, 1956, Serial No. 603,752

6 Claims. (Cl. 23—310)

This invention relates to fluid-liquid contacting. In one aspect it relates to apparatus and a method for contacting a gas with a liquid. In another aspect it relates to contacting a first liquid with a second liquid. In still another aspect it relates to a method for charging treating vessels with fresh treating liquid and removing used treating liquid without shutting down the fluid-liquid contacting operation.

My invention actually includes two separate and distinct embodiments, first, contacting a gas with a liquid, and second, contacting a liquid with a liquid treating agent and ordinarily the treating agent has a greater density than the liquid being treated or contacted.

An example of the first is the contacting of a gas with a liquid, as for example, contacting of a gas containing carbon dioxide with aqueous sodium hydroxide for carbon dioxide removal, contacting a gas containing hydrogen sulfide with caustic soda for hydrogen sulfide removal. Still another example of this first embodiment is to scrub or contact an ammonia synthesis gas with aqueous sodium hydroxide for removal of carbon dioxide prior to subsequent use of the carbon dioxide free gas. An example of the second embodiment involves liquid-liquid contacting operations which are common in many industries, for example, solvent extraction of a hydrocarbon oil with such a solvent as phenol, furfural, nitrobenzene and the like, in which the extraction agent has a greater density than that of the oil being treated. In either of these embodiments used or spent treating agent must be renewed, especially when the treating agent is of the type which becomes permanently spent with use. It is to fluid-liquid contacting operations of this type that my invention is mainly directed.

An object of my invention is to provide apparatus and a method for withdrawing used liquid treating agent and adding new treating agent to the apparatus without interrupting a fluid-liquid operation in progress in the apparatus.

An object of my invention is to porvide an apparatus and a method for continuously contacting a fluid with a liquid treating agent and as one body of treating agent becomes spent discarding the spent treating agent from a first contacting vessel, transferring another batch of treating agent from a second vessel to the first vessel and adding a fresh batch of treating agent to the second vessel without interrupting the continuous contacting operation.

Another object of my invention is to provide apparatus for such operation which is relatively inexpensive to construct and easy to operate.

In the drawing, the figure illustrates, in diagrammatic form, an arrangement of apparatus parts for carrying out the process of my invention.

I achieve the above-mentioned and other objects and advantages by providing in a continuous multiple stage fluid-treating liquid contacting operation wherein a fluid is serially contacted in separate zones by separate treating liquids, a method for carrying out this continuous multi- stage contacting operation while discharging used contacting liquid from and charging fresh contacting liquid to the operation comprising introducing a fluid to be contacted into a first fluid-contacting liquid contacting zone, introducing a second contacting liquid from a second run storage zone, subsequently mentioned, into said first contacting zone, and therein countercurrently contacting said second contacting liquid and said fluid, withdrawing contacted fluid from said first contacting zone and introducing same into a second fluid-contacting liquid contacting zone, introducing a further quantity of said second contacting liquid from said second run storage zone into said second contacting zone, and therein countercurrently contacting the once-contacted fluid with second contacting liquid in said second fluid-liquid contacting zone, passing said second contacting liquid from said first contacting zone and from said second contacting zone to the previously mentioned second run storage zone, and withdrawing used first treating liquid from a first run storage zone, upon substantial completion of the withdrawal of said first contacting liquid from said first run storage zone diverting said second contacting liquid from said first contacting zone to said first run storage zone, continuing passage of said second contacting liquid to said first contacting zone until substantially the entire quantity of said second treating liquid is transferred to said first contacting zone, terminating flow of said second contacting liquid from said second run storage zone to said first contacting zone and introducing fresh treating liquid into one of said second contacting zone and said second run storage zone, and continuously withdrawing contacted fluid from said second contacting zone as the product of the process.

In the normal operation of a two-stage fluid-liquid contacting system, illustrated in the drawing, fluid to be treated enters a vessel 11 of a 2-vessel system, from a source not shown through a pipe 16. Treated fluid leaves vessel 11 through a pipe 25. The lower portion of the vessel 11 comprises a treating liquid surge or run storage tank 17. Treating liquid from tank 17 in normal operation is passed through a pipe 20 with valves 21 and 27 being open and transferred by a pump 24 through a pipe 26 and introduced into the upper portion of vessel 11. This contacting or treating liquid flows downwardly in countercurrent relation with upflowing fluid being contacted or treated. After contacting the upflowing fluid the treating liquid emerges from the lower portion of a fluid-liquid contacting apparatus 12 and settles on a separator or bell tray 13. This bell tray 13 is provided with an overflow 37. When the level of the treating liquid on tray 13 reaches the top of the overflow treating liquid flows through the over-flow into the surge tank 17 to complete its cycle.

Likewise, in normal operation of a second vessel 40 the once-treated fluid from vessel 11 is removed therefrom through pipe 25 and is introduced into vessel 40 at at least below fluid-liquid contacting apparatus 41. Treating liquid from storage or surge tank 46 is passed through a pipe 42 with valves 43 and 48 being open and is passed by a pump 45 through pipe 44 into the top of vessel 40. This second treating liquid countercurrently contacts upflowing fluid in contacting material 41, the finally contacted fluid being removed from vessel 40 through a pipe 47 to such disposal as desired. The treating Liquid after reaching the bottom of the packing material 41 merely falls or flows into the storage tank 46 prior to recirculation.

These aforementioned operations of vessels 11 and 40 continue until such time as the treating liquid in vessel 11 becomes spent or substantially spent at which time it becomes necessary to discard the treating liquid from vessel 11 and to add fresh treating liquid thereto. My invention is directed mainly to a method for making such a transfer of treating liquid, as for example, treating liquid which has been used in vessel 40 is transferred to vessel 11 while at the same time spent or used treating liquid is removed from vessel 11 and at the proper time fresh treating liquid is introduced into vessel 40.

For making the above-mentioned transfer of treating agents from vessel 40 to vessel 11 the following procedure is given as an illustration. Valve 21 in pipe 20 is closed and valve 23 in pipe 22 is opened so as to permit flow of treating liquid from tank 46 through pipes 42, 22 and 20 to pump 24 which then transfers this liquid on through pipe 26 into the top of vessel 11. At about the same time, valve 15 in pipe 14 is opened so that liquid reaching the bell tray 13 will flow through pipe 14 into the storage tank 46 of vessel 40 in place of passing to the storage tank 17 of a vessel 11. In order to make certain that liquid treating agent from tank 46 which is passed through the just-mentioned pipes to vessel 11, flows through pipe 14 back to tank 46 it is merely necessary to hold the level of this treating liquid on the bell tray below the top surface of the overflow 37. After this circulation has been established, a valve 19 in a pipe 18 is opened so as to withdraw the used or spent treating liquid from the storage tank 17 for disposal.

At the same time, that treating liquid from tank 46 is being circulated through vessel 11, a portion of the treating liquid from tank 46 is also passed through valve 48 in pipe 42 to pump 45 which transfers the liquid through pipe 44 into the top of treating vessel 40 containing the fluid-liquid contacting apparatus 41. This treating liquid from contacting apparatus 41 merely flows downward countercurrently with fluid being contacted and again accumulates in the storage tank 46. Thus, at this stage of the operation, the liquid treating agent from storage tank 46 is providing treating agent for the operation of both of the contacting vessels. This dual operation from treating liquid in tank 46 continues until such time as all or substantially all of the treating agent from tank 17 has been removed through pipe 18. At the time that all of the treating agent from tank 17 has been removed, valve 19 in pipe 18 is closed and valve 15 in pipe 14 is also closed. Upon closing valve 15 in pipe 14 the level of the treating agent liquid on the bell tray 13 rises because it is not being removed through pipe 14 and finally passes through overflow 37 into the tank 17. This operation continues with treating liquid from tank 46 supplying both vessels with treating liquid until such time as the major portion or substantially all of the treating liquid from vessel 46 has actually been transferred by way of pipes 42, 22, 20, pump 24 and pipe 26 to column 11 and finally to the tank 17. When this transfer is complete, valve 29 in pipe 28 is opened and fresh treating liquid is introduced into tank 46. Immediately, valve 23 in pipe 22 is closed so that new treating agent introduced into tank 46 will not be transferred to tank 17. This new treating liquid from pipe 28 entering tank 46 flows downward through pipe 42 and is pumped by pump 45 through pipe 44 for circulation through vessel 40. New agent is introduced into tank 46 until such time as a sufficient quantity of new treating agent has been introduced thereinto. When sufficient agent has been added, valve 29 in pipe 28 is closed and the operation of vessel 40 is then its normal operation as the second contacting step for the fluid undergoing treatment.

Simultaneously with the closing of valve 23 in pipe 22, valve 21 in pipe 20 is opened so that pump 24 will take suction on the treating liquid just transferred to tank 17, for passage thereof to pipe 26 for continuing contacting of the fluid undergoing treatment in vessel 11.

This operation just described is the operation carried out when the fluid undergoing treatment is a gas, as for example, an ammonia synthesis gas being washed by aqueous sodium hydroxide for removal of carbon dioxide.

This same flow operation is used when a dense liquid is contacting a light liquid, as in the above-mentioned example of solvent extracting a hydrocarbon oil with a dense solvent such as furfural, phenol, nitrobenzene, sulfur dioxide, or the like. In this case, liquid hydrocarbon being a fluid enters vessel 11 through pipe 16 and is countercurrently contacted with the dense solvent in packing 12 and the contacted light liquid passes through pipe 25 from the top of vessel 11 into vessel 40 for passage through contacting material 41 for a second treatment.

One of the important advantages of my method of transferring a treating liquid from vessel 40 into vessel 11 is that the transfer is accomplished with very little mixing of a spent treating agent in vessel 11 with the newly added treating agent from vessel 40.

Another important advantage of my invention is that the transfer of treating agent from a second vessel to a first vessel is accomplished while withdrawing spent treating agent from the first vessel and without interfering with the general operation of the process.

It will be realized by those skilled in the art that it would be advantageous to employ instrumentation for regulating or controlling the operation of this liquid transfer. For example, a liquid level controller could be installed to operate valve 15 in response to the level of the liquid on the bell tray 13 so as not to remove liquid from tray 13 too rapidly nor too slowly through pipe 14. In this latter case, when liquid is removed too slowly from bell tray 13 through pipe 14 liquid level on the tray reaches the top of the overflow 37 and falls into storage tank 17 to be mixed with the used or spent treating liquid in tank 17. Any liquid so mixed with the used treating liquid in tank 17 would, of course, be withdrawn through pipe 18 and disposed of. Such a loss of new treating agent would represent a loss. Similarly, a liquid level controller could be installed in tank 17 so as to close valve 19 at the time the level of the liquid reached substantially the bottom of the tank.

In like manner, a liquid level controller is under some conditions desired to be installed in conjunction with storage tank 46 so that when the level of the treating liquid reaches the predetermined low level in this tank, a controller would operate to close valve 23 in pipe 22 and to open valve 21 in pipe 20 and at the same time open valve 29 in pipe 28 for admission of fresh treating agent into the treater 40. In this manner when all or substantially all of the treating liquid from tank 46 has been transferred to tank 17 valve 23 is closed and valve 21 is opened so that the treating the newly transferred treating liquid in tank 17 circulates to vessel 11 in closed circuit form.

Other auxiliary apparatus such as pressure regulators, controllers, and the like and temperature and pressure indicating and control equipment as desired, could be installed and operated by those skilled in the art. Such auxiliary equipment is not shown herein for purposes of brevity. The installation and operation of such equipment is well understood by those skilled in the art.

The fluid-liquid contacting apparatus 12 and 41 is any such equipment suitable for promoting the particular contacting at hand—bubblecap trays, broken material, Raschig rings and the like are used.

The treating or contacting vessels 11 and 40 are in some cases used merely as first and second stage contactors or, if desired, vessel 11 is used as the main contactor while vessel 40 is employed merely as a guard chamber to make certain that the fluid undergoing contacting is properly contacted or treated before it leaves the system.

The principle herein disclosed is easily adaptable by those skilled in the art to a 3-stage, 4-stage operation or other fluid-liquid contacting operation involving a larger number of stages, and is used for transferring a batch of treating liquid from any one contacting stage to a next prior stage as regards flow of fluid being contacted or treated without disrupting continuous contacting of fluid.

While certain embodiments of the invention have been described for illustrative purposes, the invention obviously is not limited thereto.

I claim:

1. A continuous multi-stage fluid-liquid contacting operation comprising withdrawing a previously used contacting liquid from a first run storage zone in the absence of introduction of contacting liquid into said first run storage zone, introducing a fluid, and a portion of a second quantity of said contacting liquid from a second run storage zone directly into a first contacting zone, passing fluid from said first contacting zone, and another portion of contacting liquid directly from said second storage zone into a second contacting zone, removing fluid from this latter contacting zone as the product of the operation, passing said contacting liquid from said first and said second contacting zones into said second run storage zone, upon substantial completion of withdrawal of contacting liquid from said first storage zone passing said contacting liquid from said first contacting zone into said first storage zone until said second storage zone is substantially depleted of contacting liquid then passing contacting liquid from said first storage zone to said first contacting zone and introducing fresh contacting liquid into said second contacting zone.

2. In a continuous multi-stage fluid-liquid contacting operation wherein fluid is contacted serially in separate zones by separate quantities of contacting liquid, a method for carrying out this continuous multi-stage operation while discharging used contacting liquid from and charging fresh contacting liquid to the operation comprising withdrawing a previously used contacting liquid from a first run storage zone in the absence of introduction of contacting liquid into said first run storage zone, introducing a fluid to be contacted, and a portion of a second quantity of said contacting liquid from a second run storage zone directly into a first contacting zone, passing contacted fluid from said first contacting zone, and another portion of contacting liquid directly from said second storage zone into a second contacting zone, removing fluid from the latter contacting zone as the product of the operation, passing said contacting liquid from said first and said second contacting zones into said second run storage zone, upon substantial completion of withdrawal of contacting liquid from said first storage zone diverting first contacting zone contacting liquid from passing to said second storage zone to said first storage zone until said second storage zone is substantially depleted of contacting liquid then passing contacting liquid from said first storage zone to said first contacting zone, and introducing fresh contacting liquid into said second contacting zone.

3. An apparatus comprising a first fluid-liquid contacting vessel, a first liquid storage vessel in communication with said first contacting vessel, a second fluid-liquid contacting vessel, a second liquid storage vessel in communication with said second contacting vessel, an inlet for introduction of fluid to be contacted to said first contacting vessel, a first conduit for passage of contacted fluid from said first contacting vessel to said second contacting vessel, a second conduit for withdrawal of liquid from said first liquid storage vessel, a third conduit for passage of liquid from said first storage vessel to said first fluid-liquid contacting vessel, a fourth conduit for passage of liquid from said second storage vessel to said second fluid-liquid contacting vessel, a fifth conduit for passage of liquid from said second storage vessel directly to said first fluid-liquid contacting vessel, an outlet for contacted fluid from said second fluid-liquid contacting vessel, a liquid take-off means in the lower portion of said first fluid-liquid contacting zone, a sixth conduit for passage of liquid from said take-off means to said second liquid storage vessel and separate fluid-liquid contacting means in said first and in said second fluid-liquid contacting vessels.

4. The apparatus of claim 3 wherein said liquid take-off means is a bell tray, said bell tray defining the lower portion of said first fluid-liquid contacting vessel, and a liquid removal conduit communicating the space in said first fluid-liquid contacting vessel above and adjacent said tray with said sixth conduit.

5. In a continuous multiple stage fluid-liquid contacting operation wherein a fluid is serially contacted in separate zones by separate quantities of a contacting liquid, the improvement comprising withdrawing used contacting liquid from a first run storage zone in the absence of introduction of contacting liquid into said first run storage zone, introducing a fluid to be contacted into a first contacting zone, introducing a portion of a second quantity of contacting liquid from a second run storage zone directly into said first contacting zone, and therein countercurrently contacting said portion of contacting liquid and said fluid, withdrawing contacted fluid from said first contacting zone and introducing same into a second fluid-liquid contacting zone, introducing another portion of said second quantity of said contacting liquid directly from said second run storage zone into said second contacting zone, and therein countercurrently contacting the once contacted fluid with said another portion of said contacting liquid, passing said contacting liquid from said first contacting zone and from said second contacting zone to said second run storage zone, upon substantial completion of the withdrawal of said contacting liquid from said first run storage zone diverting said contacting liquid from said first contacting zone to said first run storage zone, continuing passage of said contacting liquid from said second storage zone to said first contacting zone until substantially the entire quantity of said contacting liquid is transferred to said first contacting zone, terminating flow of contacting liquid from said second run storage zone to said first contacting zone, passing contacting liquid from said first storage zone to said first contacting zone, and introducing fresh contacting liquid into said second run storage zone and continuously withdrawing contacted fluid from said second contacting zone as the product of the process.

6. In a continuous multiple stage fluid-liquid contacting operation wherein a fluid is serially contacted in separate zones by separate quantities of a contacting liquid, the improvement comprising withdrawing used contacting liquid from a first run storage zone in the absence of introduction of contacting liquid into said first run storage zone, introducing a fluid to be contacted into a first contacting zone, introducing a portion of a second quantity of contacting liquid from a second run storage zone directly into said first contacting zone, and therein contacting said portion of contacting liquid and said fluid, withdrawing contacted fluid from said first contacting zone and introducing same into a second fluid-liquid contacting zone, introducing another portion of said second quantity of said contacting liquid directly from said second run storage zone into said second contacting zone and therein contacting the once contacted fluid with said another portion of said contacting liquid, passing said portions of contacting liquid from said first contacting zone and from said second contacting zone to said second run storage zone, upon substantial completion of the withdrawal of said contacting liquid from said first run storage zone diverting said contacting liquid from said first contacting zone to said first run storage zone, continuing passage of said contacting liquid from said second storage zone to said first contacting zone until substantially the entire quantity of said contacting liquid is transferred to said first contacting zone, terminating flow of contacting liquid from said second run storage zone to said first contacting zone, passing contacting liquid from said first storage zone to said first contacting zone, and introducing fresh contacting liquid into said second run storage zone, and continuously withdrawing contacted fluid from said second contacting zone as the product of the process.

References Cited in the file of this patent

FOREIGN PATENTS

| | | |
|---|---|---|
| 970,110 | France | June 7, 1950 |
| 727,379 | Great Britain | Mar. 30, 1955 |